United States Patent

Pechmèze et al.

[11] 4,035,397
[45] July 12, 1977

[54] POLYFLUORO ACID ANTHRAQUINONE DYESTUFFS THEIR PREPARATION AND THEIR USE

[75] Inventors: Jacques Pierre Edmond Pechmèze, Paris; Philippe Jean-Marie Touratier, Deuil La Barre; Louis Antoine Cabut, Nogent sur Oise, Creil, all of France

[73] Assignee: Produits Chimiques Ugine Kuhlmann, Paris, France

[21] Appl. No.: 487,683

[22] Filed: July 11, 1974

[30] Foreign Application Priority Data

July 17, 1973 France .................. 73.26112

[51] Int. Cl.² ............................ C09B 1/52
[52] U.S. Cl. ....................... 260/373; 8/39 R; 8/39 B; 8/54.2; 8/178 R
[58] Field of Search ......................... 260/373

[56] References Cited

U.S. PATENT DOCUMENTS

| | | | |
|---|---|---|---|
| 1,898,861 | 2/1933 | von Allmen | 260/373 |
| 2,852,535 | 9/1958 | Peter et al. | 260/373 X |
| 3,421,828 | 1/1969 | Kölliker et al. | 260/373 X |
| 3,627,472 | 12/1971 | Parsons et al. | 260/373 X |

Primary Examiner—Paul F. Shaver
Attorney, Agent, or Firm—Beveridge, DeGrandi, Kline, Lunsford

[57] ABSTRACT

Dyestuffs of the formula:

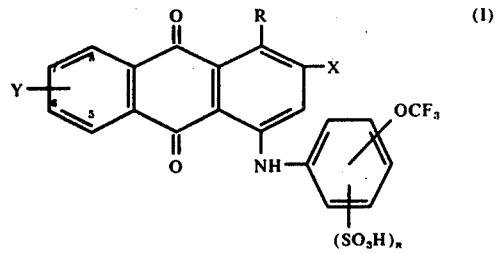

in which R represents a hydroxy, amino, alkylamino or cyclo-alkylamino group, or a residue of the formula:

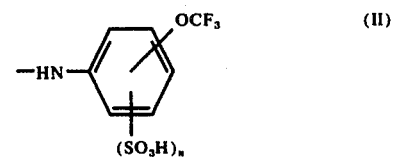

$n$ is equal to 0 or 1, X represents a hydrogen or halogen atom, a sulphonic group or an alkyl residue containing 1 to 4 carbon atoms, Y represents a hydrogen atom or a sulphonic group in position 5, 6, 7 or 8 at least one of the symbols X and Y representing a sulphonic group if $n$ is equal to 0; process for the preparation of such dyestuffs; process for the coloration of natural or synthetic polyamide fibres with such dyestuffs and natural or synthetic polyamides dyed or printed with such dyestuffs.

3 Claims, No Drawings

POLYFLUORO ACID ANTHRAQUINONE DYESTUFFS THEIR PREPARATION AND THEIR USE

The invention relates to new polyfluoro acid dyestuffs of the anthraquinone series, to their preparation and to their use.

According to the present invention dyestuffs are provided of the general formula:

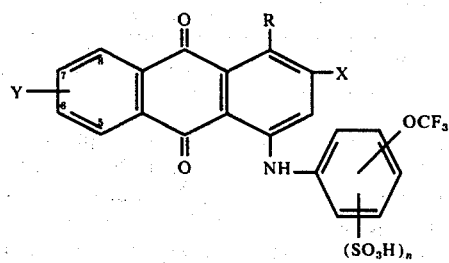

in which R represents a hydroxy, amino, alkylamino or cycloalkyl-amino group or a residue of the formula:

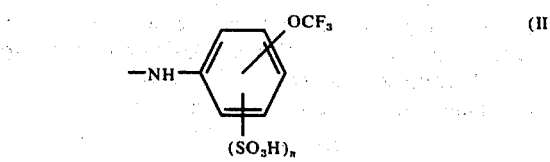

$n$ is equal to 0 to 1, X represents a hydrogen or halogen atom, a sulpho group or an alkyl residue containing 1 to 4 carbon atoms, and Y represents a hydrogen atom or a sulpho group in position 5, 6, 7 or 8, at least one of the symbols X and Y representing a sulphonic group if $n$ is equal to 0.

The alkylamino group, which R may represent, preferably contains 1 to 4 carbon atoms. The cyclohexylamino group is the preferred cycloalkylamino group. In formulae (I) and (II), the trifluoromethoxy group may occupy the ortho, meta or para position relative to the —NH— bridge.

The dyestuffs of formula (I) may be prepared for example by condensing o-, m- or p-trifluoromethoxyaniline with a compound of the general formula:

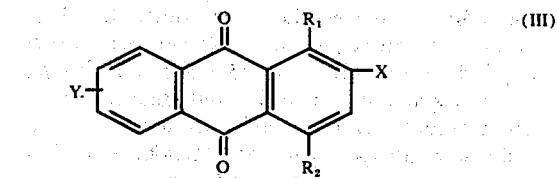

in which X and Y have the meanings given above, $R_1$ represents a hydroxy, amino, alkylamino or cycloalkylamino group, $R_2$ represents a halogen atom, preferably bromine, or even a hydroxy group if $R_1$ represents a hydroxy group and X represents a hydrogen group, then sulphonation of the product thus obtained if the compound of formula (III) does not contain any sulphonic group.

Examples of compounds of formula (III) are quinizarine, 1-amino-4-bromo-anthraquinone-2-sulphonic acid, 1-cyclohexylamino-4bromo-anthraquinon-5sulphonic acid, 1-cyclohexyl-amino-4bromo-anthraquinone-6 and/or 7-sulphonic acid,1-methylamino-4-bromo-anthraquinon, 1-cyclohexylamino-4-bromo-anthraquinone and 1-amino-2,4-dibromo-anthraquinone.

The compounds of formula (III) and trifluoromethoxyanilines may be condensed according to known processes.

Sulphonation may be effected at atmospheric temperature or at a higher temperature, by means of sulphuric acid or oleum.

When in the form of salts, the dyestuffs of formula (I) easily dissolve in water. They are particularly suitable for dyeing and printing natural or synthetic polyamide textile materials to which they give blue shades which are fast particularly to wet tests.

Examples of natural polyamides are wool and silk. Examples of synthetic polyamides are the products of condensation of hexamethylene diamine with adipic (polyamide 66) or sebacid acid (polyamide 610), the polymerisation products of Δ-caprolactam (polyamide 6) and the polymerisation products of ω-aminoundecanoic acid (polyamide 11).

Compared with the analogous non-fluoro dyestuffs of the general formula:

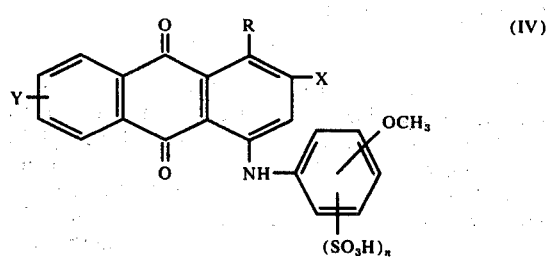

in which R, X, Y and n have the meanings given above the dyestuffs of the invention are characterised by their absorption maximum being displaced towards the shortest wavelengths and by a substantially improved fastness to wet tests and this is completely unexpected.

The invention is illustrated by the following Examples in which the parts and percentages are parts and percentages by weight.

EXAMPLE 1

A mixture of 30 parts of water, 12.5 parts of 95% ethanol, 4.8 parts of the 93.9% sodium salt of 1-amino-4-bromo-anthraquinone-2-sulphonic acid, 7.8 parts of paratrifluoromethyoxy-aniline, 2 parts of sodium bicarbonate and 0.04 parts of cuprous chloride is heated at 92° C. for 16 hours, with stirring and under a nitrogen atmosphere. The mixture is then diluted with 200 parts of water, brought to boiling point and acidified up to pH 3–4 by the addition of hydrochloric acid. The mixture is filtered whilst hot, the precipitate is washed with a solution of 10% sodium chloride until neutral, then with water until the filtrate becomes slightly coloured, and oven-dried at 50° C. 3.2 parts of a blue dyestuff is obtained, constituted by the sodium salt of 1-amino-4-(paratrifluoromethoxy-anilino)-anthraquinone-2-sulphonic acid.

| Analysis | C % | H % | N % | F % |
| --- | --- | --- | --- | --- |
| Calculated for $C_{21}H_{12}F_3N_2NaO_6S$ | 50.4 | 2.40 | 5.60 | 11.4 |
| Found | 49.9 | 2.96 | 5.87 | 11.2 |

100 parts of "nylon" satin are steeped in a bath containing 3000 parts of water and 1 part of a wetting agent based on oxyethylenated fatty alcohol for 10 minutes at 40° C., then 0.5 to 2 parts of 80% acetic acid are added so as to obtain a pH of 4–5. 1 part of the above-mentioned dyestuff finely dispersed and which has been previously made into a paste in a little water is added. Dyeing commences at 500° C., the mixture is brought to boiling point in three-quarters of an hour whilst maintaining a level for a quarter of an hour at 75° C. and boiling is maintained for approximately one and a half hours. After rinsing and drying the fabric is dyed a bright reddish-blue shade having very good fastness to light, water, perspiration and washing.

The corresponding non-fluoro dyestuff dyes the nylon satin a greenish-blue shade whose fastness to water, perspiration and washing is inferior.

EXAMPLE 2

If, in Example 1, para-trifluoromethoxyaniline is replaced by the same quantity of meta-trifluoromethoxyaniline, 3.4 parts of a dyestuff are obtained which dyes nylon a bright reddish-blue shade whose fastness to water and to washing is superior to that of the corresponding non-fluro dyestuff.

EXAMPLE 3

2.5 parts of quinizarine, 0.2 parts of zinc powder, 1 part of boric acid and 10 parts of para-trifluoromethoxyaniline are introduced into 10 parts of 4-methyl-2pentanol, the mixture is heated up to 100° C. and then 1 part of 30% hydrochloric acid is gradually added. The mixture is refluxed for 22 hours and left to cool, the precipitate is filtered and washed with 4methyl-2-pentanol and then with water. The precipitate is taken up at boiling point in 50 parts of 7% sodium hydroxide, then filtered and washed with water until neutral. 4.4 parts of a blue product are obtained.

Gradually 2 parts of this product are introduced into 25 parts of 5% oleum and the mixture is heated at 70° C. until a sample is soluble in a solution of sodium carbonate. The mixture is then left to cool and poured into 450 parts of ice water, salted and filtered and the precipitate is mixed with sodium carbonate so that the pH rises to 8–9. 4.6 parts of a dyestuff are obtained which dyes "nylon" satin a greenish-blue shade having excellent fastness to water and washing.

The corresponding non-fluoro dyestuff dyes nylon a green shade whose fastness to water and washing is inferior.

EXAMPLE 4

12.64 parts of 1-methylamino-4bromo-anthraquinone, 9.9 parts of para-trifluoromethoxyaniline, 6 parts of potassium acetate and 2 parts of copper acetate are introduced into 43 parts of 4-methyl-2-pertanol and the mixture is heated at 132° C. for 8 hours. The mixture is then cooled to 60° C., filtered, washed with water, then the precipitate is taken up in dilute caustic soda, filtered, washed and dried. 9.6 parts of 1-methylamino-4-(p-trifluoromethoxy-anilino)-anthraquinone are obtained.

| Analysis | C % | H % | N % | F % |
| --- | --- | --- | --- | --- |
| Calculated for $C_{22}H_{15}F_3N_2O_3$ | 64.0 | 3.64 | 6.79 | 13.8 |
| Found | 63.3 | 3.73 | 6.70 | 13.38 |

Whilst the temperature is being maintained at approximately 5° C., 2 parts of this compound are dissolved in 25 parts of 5% oleum, stirred until a sample is soluble in water, then poured on ice, filtered, washed with a solution of 10% sodium chloride until neutral, then washed with water until the filtrate becomes slightly coloured, and dried. 2.4 parts of the sodium salt of 1-methylamino-4'-trifluoromethoxy-4anilino-anthraquinone-2'-sulphonic acid are obtained.

| Analysis | C % | H % | N % | F % |
| --- | --- | --- | --- | --- |
| Calculated for $C_{22}H_{14}F_3N_2NaO_6S$ | 51.3 | 2.92 | 5.45 | 11.1 |
| Found | 50.5 | 2.75 | 5.1 | 10.5 |

In accordance with the process of Example 1, 100 parts of "Rilsan" fibres are steeped in 3000 parts of water, the pH is brought to 6–7 by the addition of crystallised ammonium acetate and 0.5 parts of the above dyestuff is added. After dyeing for one and a half hours at boiling point and rinsing, a reddish-blue colouration is obtained which is very fast to water and washing.

EXAMPLE 5

If, in Example 4, para-trifluoromethoxyaniline is replaced by the same quantity of 0-trifluoromethoxyaniline, a dyestuff is obtained which dyes Rilsan a reddish-blue shade which is very fast to wet tests.

EXAMPLE 6

28.8 parts of 1-cyclohexylamino-4-bromo-anthraquinone, 16.5 parts of para-trifluoromethoxyaniline, 7.8 parts of potassium acetate and 0.75 parts of copper acetate are introduced into 33 parts of 4-methyl-2-pentanol and heated at 130° C. for 24 hours. The mixture is cooled to 70° C., diluted with 30 parts of ethanol, filtered, washed with 2% hydrochloric acid, then with water until neutral and dried. 16.2 parts of 1-cyclohexyl-amino- 4-(trifluoromethoxy-anilino)-anthraquinone are obtained.

3 parts of this compound are dissolved between −5° C. and 0° C. in a mixture of 20 parts of 100% sulphuric acid and 4 parts of 25% oleum.

The mixture is first of all stirred at a temperature close to 9° C, then at 20°–25° C. until a sample dissolves totally in water. The mixture is poured onto 250 parts of ice, filtered and washed with cold water. The filter cake is made into a paste with sodium carbonate so that the pH rises towards 7–8 dried and ground. 3.8 parts of 1-cyclohexylamino-4-(2-sulpho-4-trifluromethoxyanilino)-anthraquinone (sodium salt) are obtained.

This dyestuff dyes nylon a reddish-blue shade which is remarkably fast to water and washing.

Compared with the corresponding non-fluoro greenish-blue dyestuff is distinguished by superior fastness to wet tests.

EXAMPLE 7

7 parts of a mixture of 1-cyclohexylamino-4bromoanthraquinone-6 and -7sulphonic acids, 7 parts of paratrifluoromethoxy-aniline, 7 parts of sodium bicarbonate and 0.5 parts of active copper are introduced into 105 parts of water and 35 parts of 95% ethanol then the mixture is heated at 95° C. for 8 hours, filtered, and the precipitate is taken up in dilute hydrochloric acid and refiltered. The filter cake is made into a paste with sodium carbonate so that the pH rises to 7–8 and dried. The dyestuff thus obtained of the formula:

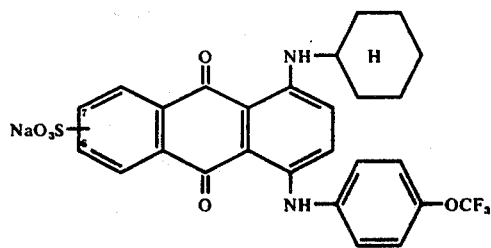

dyes nylon a reddish-blue shade having excellent fastness to water and severe washing, this fastness being superior to that of the corresponding greenish-blue non-fluoro dyestuff.

We claim:

1. Dyestuffs of the formula:

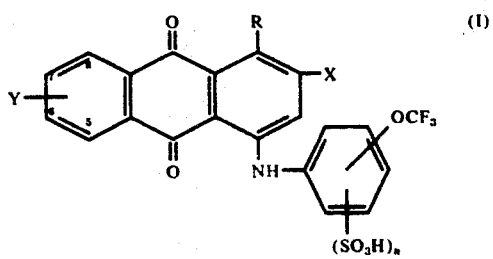

in which R represents a hydroxy amino, alkylamino or cycloalkylamino group, or a residue of the formula:

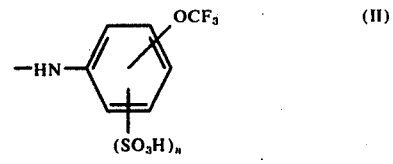

$n$ is equal to 0 or 1, X represents a hydrogen or halogen atom, a sulponic group or an alkyl residue containing 1 to 4 carbon atoms, Y represents a hydrogen atom or sulphonic group in position 5, 6, 7 or 8 at least one of the symbols X and Y representing a sulphonic group if $n$ is equal to 0.

2. Dyestuffs according to claim 1 wherein R is an alkylamino group containing 1 to 4 carbon atoms.

3. Dyestuffs according to claim 1 wherein R is a cyclohexylamino group.

* * * * *